(12) United States Patent
Hollewa

(10) Patent No.: US 12,054,117 B1
(45) Date of Patent: Aug. 6, 2024

(54) SEATBELT SYSTEM FOR INDIVIDUALS USING A WHEELCHAIR IN A VEHICLE

(71) Applicant: GM Global Technology Operations LLC, Detroit, MI (US)

(72) Inventor: Kenneth V. Hollewa, Washington Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/303,872

(22) Filed: Apr. 20, 2023

(51) Int. Cl.
| | | |
|---|---|---|
| *B60R 22/20* | (2006.01) | |
| *A61G 3/00* | (2006.01) | |
| *A61G 3/08* | (2006.01) | |
| *B60R 22/195* | (2006.01) | |
| *B60R 22/24* | (2006.01) | |
| *B60R 22/18* | (2006.01) | |

(52) U.S. Cl.
CPC ............... *B60R 22/20* (2013.01); *A61G 3/00* (2013.01); *A61G 3/08* (2013.01); *B60R 22/1951* (2013.01); *B60R 22/24* (2013.01); *B60R 2022/1818* (2013.01); *B60R 2022/208* (2013.01)

(58) Field of Classification Search
CPC ......... B60R 22/03; B60R 22/04; B60R 22/06; B60R 22/18; B60R 22/20; B60R 22/201; B60R 22/22; B60R 22/24; B60R 2022/021; B60R 2022/1818; B60R 2022/207; B60R 2022/208; A61G 3/08; A61G 3/0808; A61G 3/0866
See application file for complete search history.

(56) References Cited

U.S. PATENT DOCUMENTS

| | | | | |
|---|---|---|---|---|
| 4,892,331 A * | 1/1990 | Wollner | ................ | B60R 22/201 411/401 |
| 5,026,225 A * | 6/1991 | Mcintyre | ............. | A61G 3/0808 280/808 |
| 6,769,716 B2 * | 8/2004 | Rouhana | ................ | B60R 22/02 297/480 |
| 6,802,537 B1 * | 10/2004 | Tolfsen | .................. | B60N 2/508 280/805 |
| 6,969,088 B2 * | 11/2005 | Wang | ...................... | B60R 22/28 280/805 |
| 8,016,318 B2 * | 9/2011 | Nezaki | ................... | B60N 2/688 280/808 |

(Continued)

FOREIGN PATENT DOCUMENTS

| | | | | |
|---|---|---|---|---|
| CH | 701229 A2 * | 12/2010 | ............ | A61G 3/061 |
| CN | 105564366 A * | 5/2016 | ........... | B60R 22/201 |

(Continued)

*Primary Examiner* — Barry Gooden, Jr.
(74) *Attorney, Agent, or Firm* — CANTOR COLBURN LLP

(57) ABSTRACT

A seatbelt system includes a stanchion having a first end and a second end and a linear actuator fixedly connected relative to the stanchion. The linear actuator includes a shuttle. The shuttle is shiftable between the first end and the second end of the stanchion. A seatbelt is supported by the stanchion. The seatbelt includes a buckle, a lap portion, and a shoulder portion. The lap portion is connected to the shuttle. A controller is operatively connected to the linear actuator. The controller selectively raises the shuttle to lift the lap portion of the seatbelt toward the second end of the stanchion to accommodate an individual using a wheel chair.

19 Claims, 5 Drawing Sheets

(56) References Cited

U.S. PATENT DOCUMENTS

| | | | |
|---|---|---|---|
| 9,434,349 B1* | 9/2016 | Perkins | B60R 22/03 |
| 10,688,959 B2* | 6/2020 | Bryant | B60R 22/00 |
| 11,364,872 B1* | 6/2022 | Jaradi | B60R 21/214 |
| 11,584,332 B2* | 2/2023 | Sugamata | B60R 22/20 |
| 11,590,921 B1* | 2/2023 | Farooq | B60R 21/23138 |
| 11,851,023 B2* | 12/2023 | Kim | B60R 22/26 |
| 2002/0089164 A1* | 7/2002 | Rouhana | B60R 22/02 |
| | | | 280/801.1 |
| 2009/0309344 A1* | 12/2009 | Van Roosmalen | B60R 22/03 |
| | | | 280/801.1 |
| 2010/0092263 A1* | 4/2010 | Girardin | B60R 22/24 |
| | | | 410/23 |
| 2012/0219395 A1* | 8/2012 | Inaguma | A61G 3/062 |
| | | | 414/556 |
| 2014/0303851 A1* | 10/2014 | Nagasawa, Sr. | B60R 22/201 |
| | | | 701/45 |
| 2014/0356090 A1* | 12/2014 | Cardona | B60P 7/0807 |
| | | | 410/3 |
| 2016/0311399 A1* | 10/2016 | Miller | B60R 22/201 |
| 2019/0054892 A1* | 2/2019 | Sharif | B60R 22/20 |
| 2020/0010046 A1* | 1/2020 | Sugamata | B60R 22/201 |
| 2021/0000668 A1* | 1/2021 | Sekizuka | B60R 22/48 |
| 2021/0128374 A1* | 5/2021 | Esteireiro | B60R 22/30 |
| 2021/0154063 A1* | 5/2021 | Ohno | B60R 22/24 |
| 2021/0393456 A1* | 12/2021 | Kato | B60N 2/245 |

FOREIGN PATENT DOCUMENTS

| | | | | |
|---|---|---|---|---|
| CN | 106740648 A | * | 5/2017 | |
| CN | 112168509 A | * | 1/2021 | A61F 5/3776 |
| CN | 112168511 A | * | 1/2021 | A61F 5/3776 |
| CN | 112406778 A | * | 2/2021 | A61G 3/0808 |
| DE | 102015000019 A1 | * | 7/2016 | B60R 22/03 |
| DE | 102020111829 A1 | * | 11/2021 | A61G 3/0808 |
| EP | 1591327 A1 | * | 11/2005 | B60R 22/02 |
| FR | 2756729 A1 | * | 6/1998 | A61G 3/02 |
| GB | 2200529 A | * | 8/1988 | A61G 3/0808 |
| GB | WO-9202389 A1 | * | 1/1992 | |
| JP | 2011173483 A | * | 9/2011 | A61G 3/062 |
| WO | WO-2016048154 A1 | * | 3/2016 | A61G 3/08 |

* cited by examiner

SEATBELT SYSTEM FOR INDIVIDUALS USING A WHEELCHAIR IN A VEHICLE

INTRODUCTION

The subject disclosure relates to the art of vehicles and, more particularly, to a vehicle seatbelt system for individuals using a wheelchair.

Individuals using a wheelchair have a number of options for using a vehicle depending upon disability level. Individuals may enter the vehicle through a front driver door or a front passenger door and, either by themselves, or with assistance, store the wheelchair. Other individuals may employ a lift system that raises them and their wheelchair into the vehicle. Such individuals then manipulate their wheelchair to a driver's or passenger position.

Once in the driver's or passenger's position, the individual will secure themselves with a seat belt. To do so, the individual will grasp the seat belt, draw seatbelt webbing across their body, and connect a buckle to an anchor. Certain individuals using a wheelchair have difficulty manipulating seatbelt components. Thus, manipulating and connecting a seat belt becomes a challenge. In some cases, the challenge is so great that, without help, the seatbelt may go unused. Accordingly, it is desirable to provide a seatbelt system that may accommodate individuals using a wheelchair that may not have full use of, for example, one or more of their hands.

SUMMARY

A seatbelt system, in accordance with a non-limiting example, includes a stanchion having a first end and a second end and a linear actuator fixedly connected relative to the stanchion. The linear actuator includes a shuttle. The shuttle is shiftable between the first end and the second end of the stanchion. A seatbelt is supported by the stanchion. The seatbelt includes a buckle, a lap portion, and a shoulder portion. The lap portion is connected to the shuttle. A controller is operatively connected to the linear actuator. The controller selectively raises the shuttle to lift the lap portion of the seatbelt toward the second end of the stanchion to accommodate an individual using a wheel chair.

In addition to one or more of the features described herein a belt guide is positioned above the second end of the stanchion, and a fixed anchor is spaced from the stanchion that is selectively receptive of the buckle, the lap portion extending between the shuttle and the fixed anchor and the shoulder portion extending between the belt guide and the fixed anchor.

In addition to one or more of the features described herein a lift ring is connected to the shuttle, the seatbelt passing through the lift ring.

In addition to one or more of the features described herein the linear actuator includes a motor and a worm screw, the shuttle being operatively connected to the worm screw.

In addition to one or more of the features described herein a tensioner is arranged at the first end of the stanchion, the seatbelt being connected to the tensioner.

In addition to one or more of the features described herein the seatbelt includes a first end portion operatively connected to the tensioner, a second end portion connected to a an anchor, and an intermediate portion extending between the first end and the second end.

In addition to one or more of the features described herein the intermediate portion passes through the lift ring, the belt guide, and the stanchion to the anchor, the buckle being arranged between the lift ring and the belt guide.

A vehicle, in accordance with a non-limiting example, includes a body including a floor, at least one structural support fixedly connected relative to the floor, and a seatbelt system. The seatbelt system includes a stanchion having a first end and a second end and a linear actuator fixedly connected relative to the stanchion. The linear actuator includes a shuttle. The shuttle is shiftable between the first end and the second end of the stanchion. A seatbelt is supported by the stanchion. The seatbelt includes a buckle, a lap portion, and a shoulder portion. The lap portion is connected to the shuttle. A controller is operatively connected to the linear actuator. The controller selectively raises the shuttle to lift the lap portion of the seatbelt toward the second end of the stanchion to accommodate an individual using a wheel chair.

In addition to one or more of the features described herein a belt guide is positioned above the second end of the stanchion, and a fixed anchor is spaced from the stanchion that is selectively receptive of the buckle, the lap portion extending between the shuttle and the fixed anchor and the shoulder portion extending between the belt guide and the fixed anchor.

In addition to one or more of the features described herein a lift ring is connected to the shuttle, the seatbelt passing through the lift ring.

In addition to one or more of the features described herein the linear actuator includes a motor and a worm screw, the shuttle being operatively connected to the worm screw.

In addition to one or more of the features described herein a tensioner is arranged at the first end of the stanchion, the seatbelt being connected to the tensioner.

In addition to one or more of the features described herein the seatbelt includes a first end portion operatively connected to the tensioner, a second end portion connected to an anchor, and an intermediate portion extending between the first end and the second end.

In addition to one or more of the features described herein the intermediate portion passes through the lift ring, the belt guide, and the stanchion to the anchor, the buckle being arranged between the lift ring and the belt guide.

A method of operating a seatbelt system in a vehicle configured to accommodate an individual using a wheelchair, in accordance with a non-limiting example, includes raising a lap belt portion of a seatbelt of the seatbelt system, receiving the individual in the wheelchair between a structural support and a seatbelt anchor, and lowering the lap belt portion of the seatbelt.

In addition to one or more of the features described herein raising the lap belt portion includes signaling the seatbelt system to raise the lap belt portion upon deactivating the vehicle.

In addition to one or more of the features described herein lowering the lap belt portion of the seatbelt includes activating the vehicle.

In addition to one or more of the features described herein raising the lap belt portion includes operating a motor connected to a linear actuator.

In addition to one or more of the features described herein operating the motor includes shifting a shuttle supporting a lift ring receptive of the lap belt portion.

In addition to one or more of the features described herein raising the lap belt portion includes lifting the lap belt portion to a selected user defined height.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
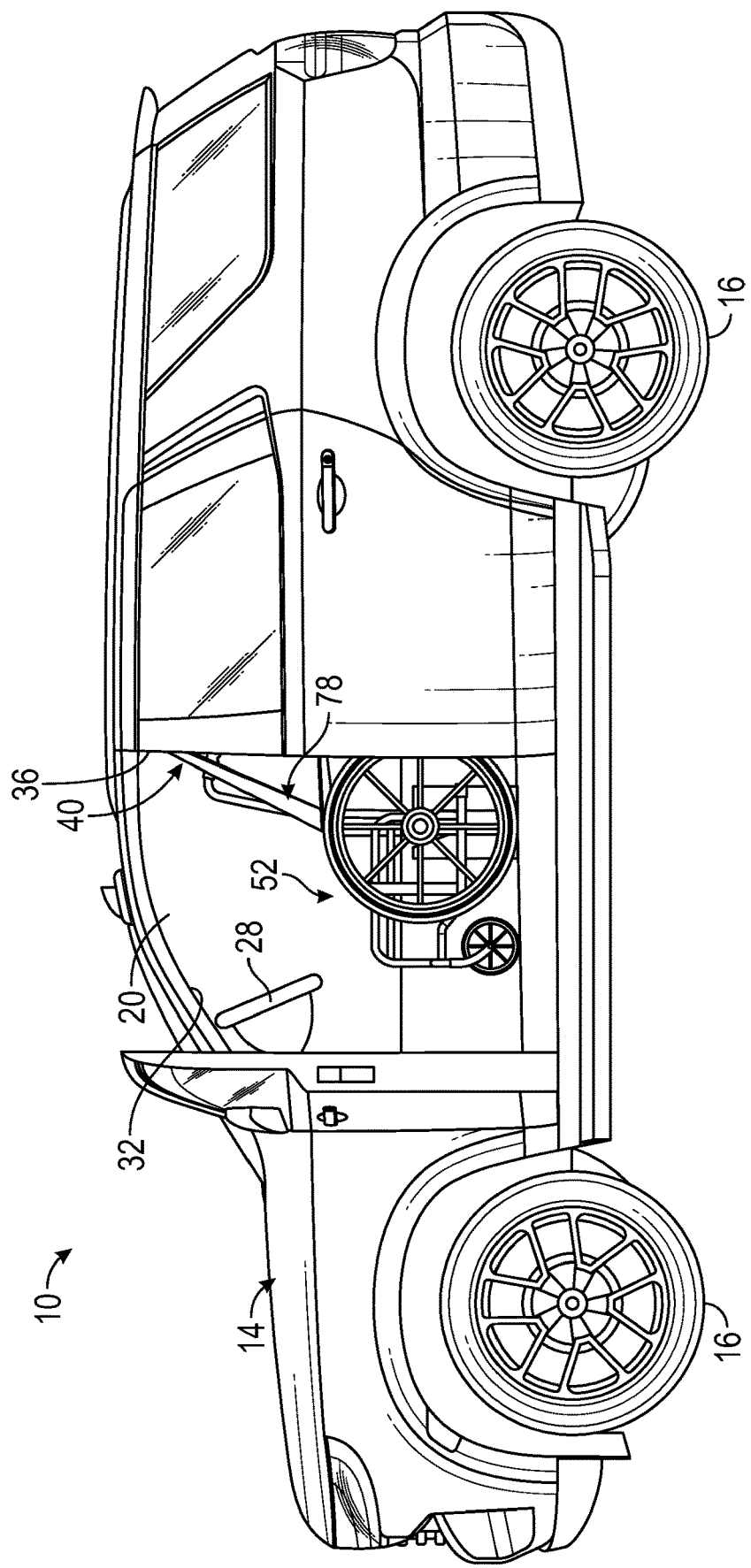
FIG. 1 is a left side view of a vehicle including a seatbelt system for individuals using a wheelchair, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
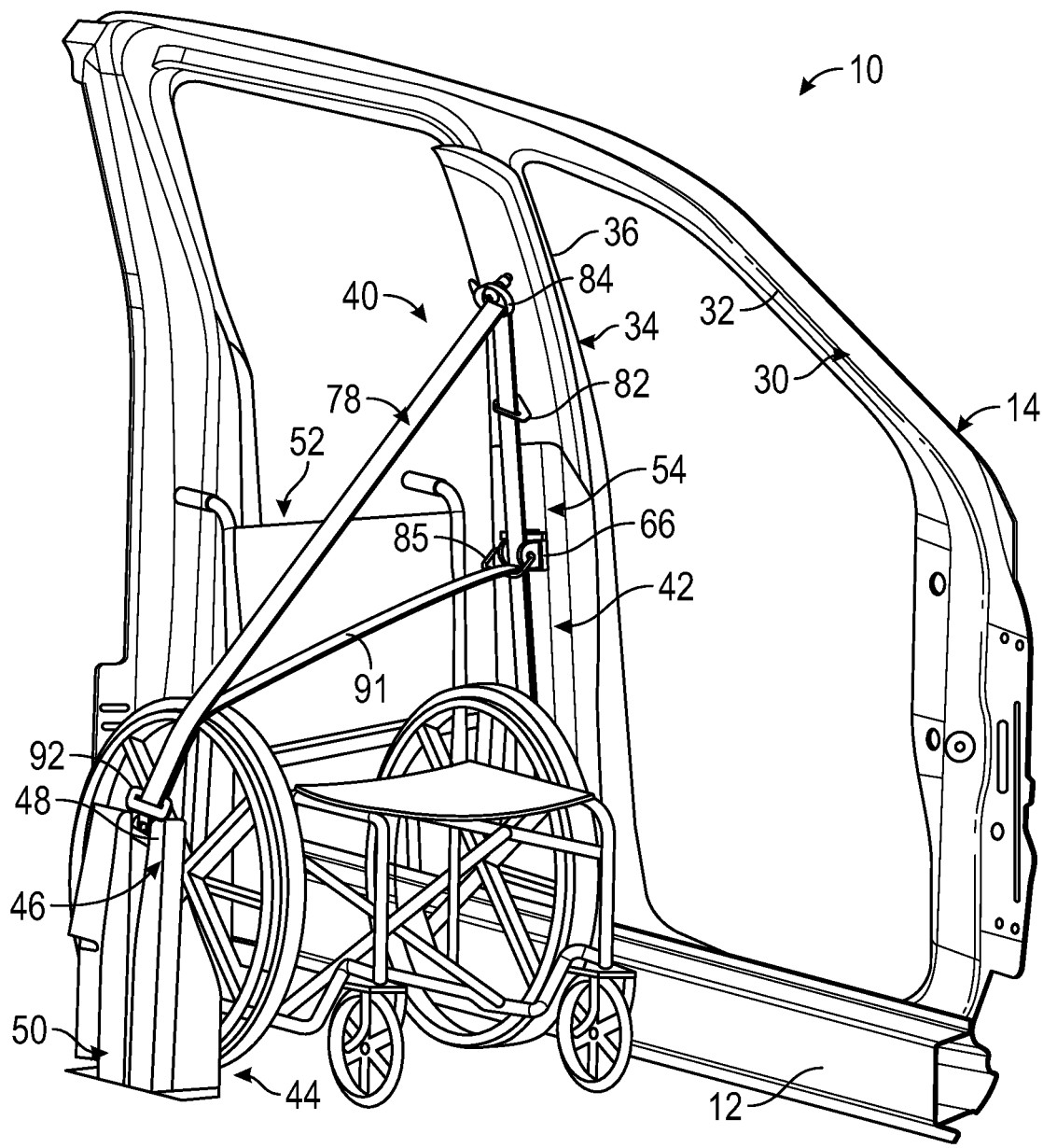
FIG. 2 is a perspective view of the seatbelt system for individuals using a wheelchair mounted in the vehicle of FIG. 1, in accordance with a non-limiting example.

A vehicle, in accordance with a non-limiting example, is indicated generally at 10 in FIGS. 1 and 2. Vehicle 10 includes a frame 12 (FIG. 2) supporting a body 14. A plurality of wheels 16 are connected to frame 12. Body 14 defines a passenger compartment 20. A steering member 28 is arranged in passenger compartment 20. Frame 12 includes a first structural support member 30 that defines an "A"-pillar 32 and a second structural support member 34 that defines a "B"-pillar 36. Body 14 is connected to first structural support member 30, second structural support member 34 as well as other structural members (not separately labeled) of frame 12.

In a non-limiting example illustrated in FIG. 2, vehicle 10 includes a seat belt system 40 that is designed to accommodate individuals in wheelchairs. Seat belt system 40 includes a belt portion 42 and an anchor portion 44. As shown in FIG. 2, anchor portion 44 includes a first anchor 46 supporting a buckle receiver 48. Buckle receiver 48 is mounted to an elevated support 50. A wheelchair dock (not separately labeled) is arranged between belt portion 42 and anchor portion 44. The wheelchair dock supports or locks a wheelchair 52 in place in passenger compartment 20. In the non-limiting example shown, the wheelchair dock secures wheelchair 52 in a driver position behind steering member 28.

Figure 3:
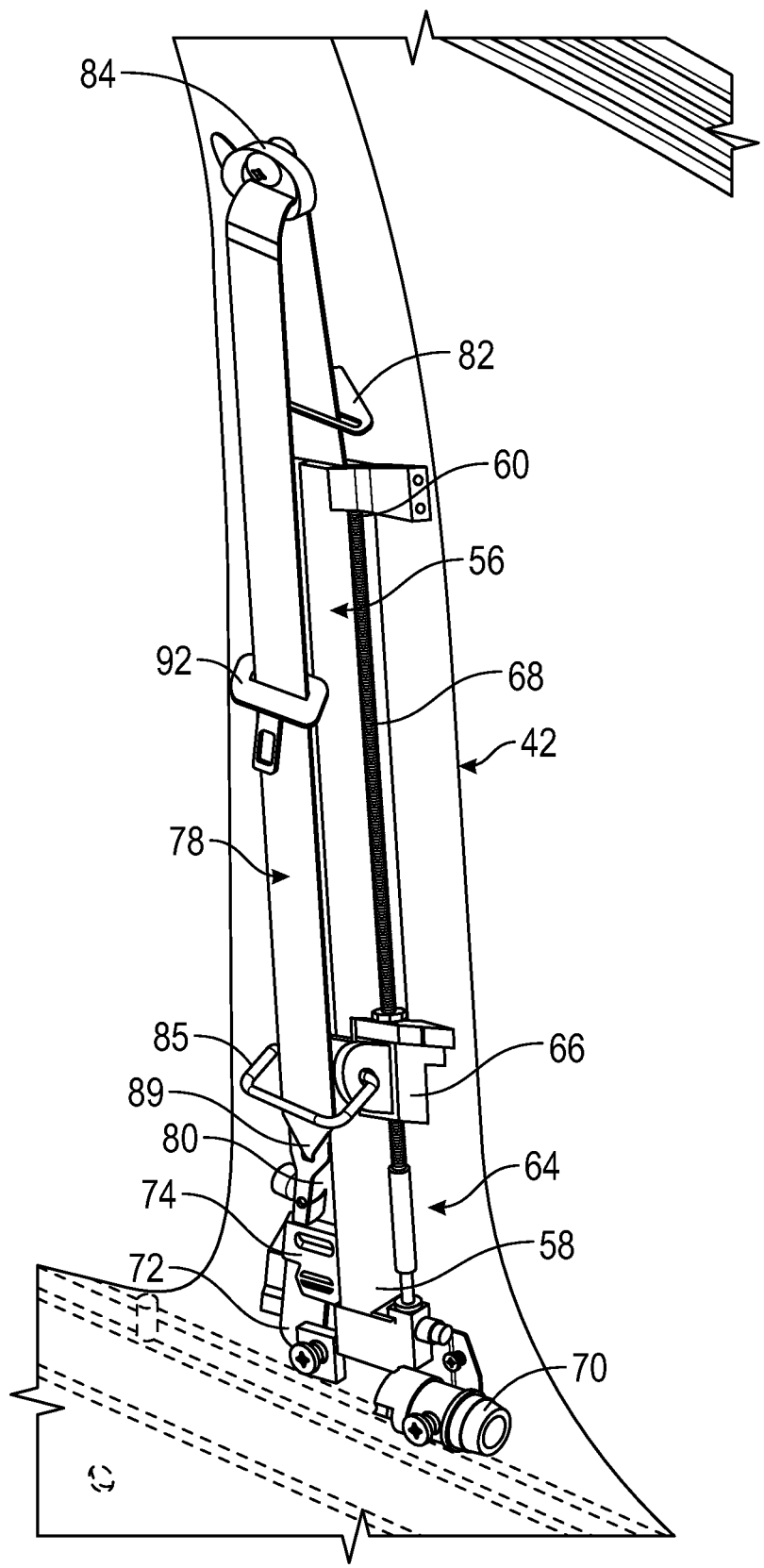
FIG. 3 is a perspective view of the seatbelt system for individuals using a wheelchair in a stowed configuration, in accordance with a non-limiting example.
Figure 4:
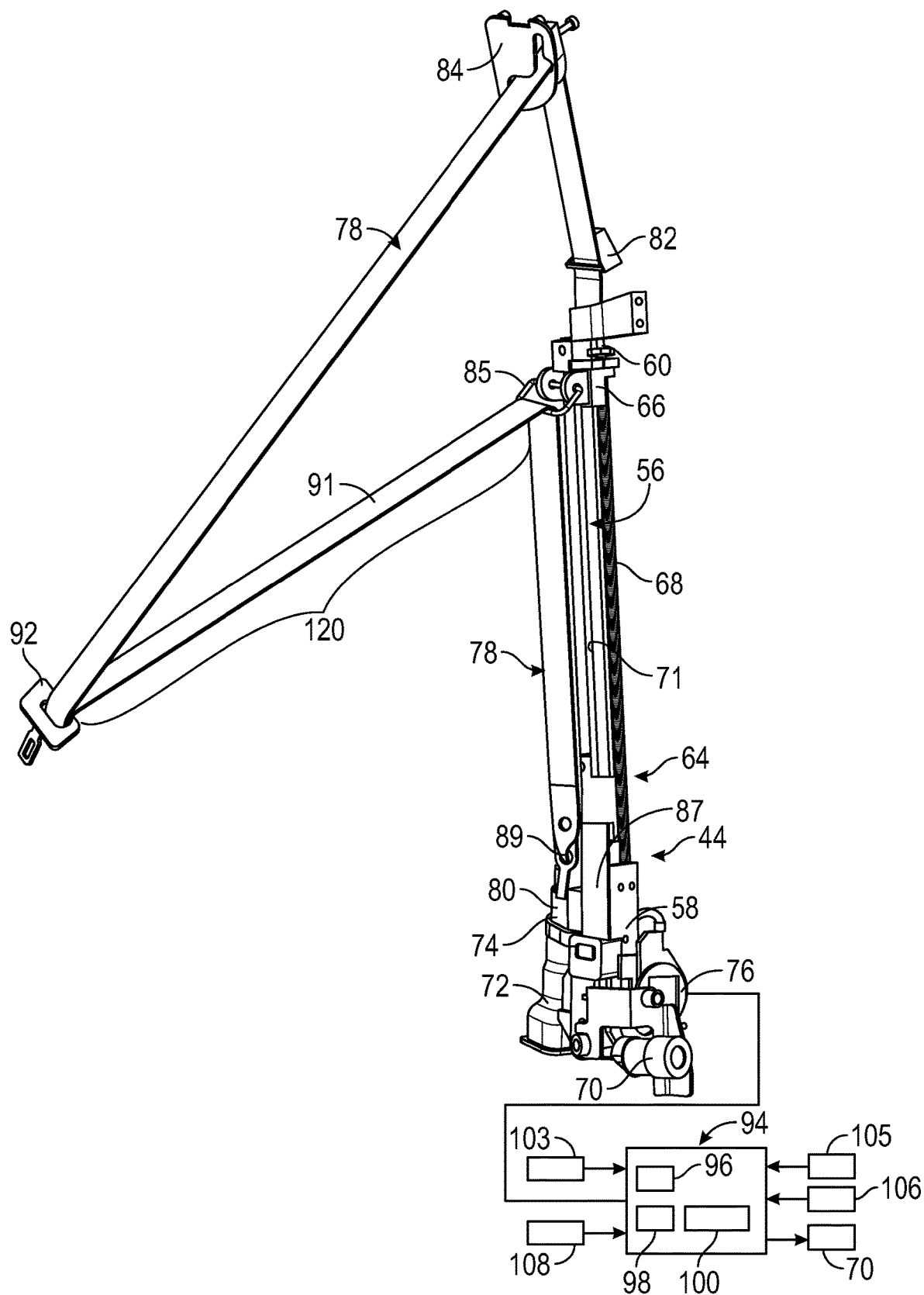
FIG. 4 is a perspective view of the seatbelt system of FIG. 3 ready to receive an individual in a wheelchair, in accordance with a non-limiting example.
Figure 5:
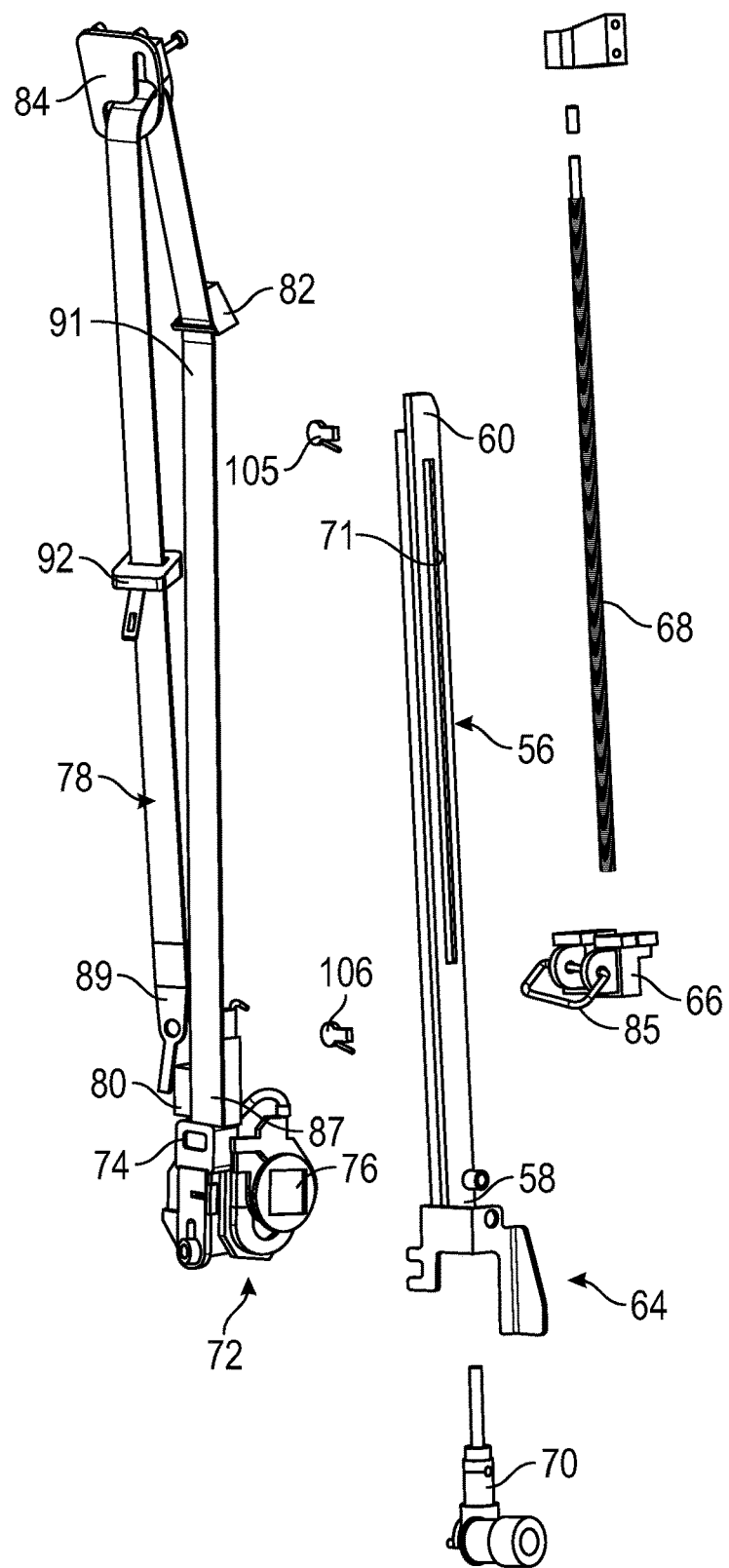
FIG. 5 is a disassembled view of the seatbelt system of FIG. 3, in accordance with a non-limiting example.

Referring to FIGS. 3, 4, and 5 and with continued reference to FIG. 2, belt portion 42 includes a cover 54 that extends across a stanchion 56 mounted to second structural support member 34. Stanchion 56 includes a first end 58 and a second end 60. First end 58 is arranged adjacent to a floor (not separately labeled) of passenger compartment 20. Stanchion 56 supports or houses a linear actuator 64 (FIG. 4) that extends between first end 58 and second end 60. Linear actuator 64 includes a shuttle 66 that translates between first end 58 and second end 60. That is, linear actuator 64 takes the form of a worm screw 68 (FIG. 5) connected to a motor 70. Motor 70 rotates worm screw 68 causing shuttle 66 to move between first end 58 and second end 60. Shuttle 66 includes a projection (not shown) that rides in a slot 71 formed in stanchion 56. In this manner, the projection constrains shuttle 66 from rotating while shifting between first end 58 and second end 60 of stanchion 56.

In a non-limiting example, a tensioner assembly 72 is fixedly mounted at first end 58 of stanchion 56 forming a first anchor 74. Tensioner assembly 72 includes a tensioner 76 having a spool (not shown) that supports a seatbelt 78. A second anchor 80 is arranged adjacent to tensioner 76. A first belt guide 82 is mounted to second structural support member 34 directly above second end 60 of stanchion 56. A second belt guide 84 is mounted to second structural support member 34 above first belt guide 82. In a non-limiting example, first belt guide 82 may be a fixed belt guide while second belt guide 84 may be a moveable belt guide. By moveable, it should be understood to describe that second belt guide 84 may rotate and/or lift relative to second structural support member 34. In addition to first belt guide 82 and second belt guide 84, a lift ring 85, mounted to shuttle 66 guides seatbelt 78 between a stowed position (FIG. 3) and a deployed position (FIG. 2).

In a non-limiting example, seatbelt 78 includes a first end portion 87 coupled to tensioner 76, a second end portion 89 coupled to second anchor 80, and an intermediate portion 91. Intermediate portion 91 extends between first end portion 87 and second end portion 89. In a non-limiting example, seatbelt 78 passes from tensioner 76, through lift ring 85 and up to second belt guide 84. Seatbelt 78 passes through second belt guide 84, through first belt guide 82, and along stanchion 56 to second anchor 80. Second end portion 89 of seatbelt 78 is connected to second anchor 80. A buckle 92 is arranged on intermediate portion 91 and positioned between lift ring 85 and second belt guide 84. With this arrangement, shuttle 66 may shift lift ring 85 and seatbelt 78 upwardly, in FIG. 4, to prepare to receive an individual in a wheelchair as will be detailed more fully herein.

A controller 94 is connected to linear actuator 64 as shown in FIG. 4. Controller 94 includes a central processor unit (CPU) 96 and a non-volatile memory 98, and a belt position module 100. Controller 94 may also include one or more sensors 103 that detect when an individual in a wheelchair is entering vehicle 10, and limit switches 105 and 106 that define end points for movement of shuttle 66. The projection on shuttle 66 may interact with limit switches 105 and 106 to signal controller 94 that upward (limit switch 105) and/or downward (limit switch 106) travel boundaries have been reached. In a non-limiting example, non-volatile memory 98 may include a non-transitory computer-readable medium having instructions stored thereon, that when executed by, for example, CPU 96 shifts intermediate portion 91 of seatbelt 78, with shuttle 66, between a driving configuration (FIG. 2) and an individual in a wheelchair receiving configuration (FIG. 4).

In a non-limiting example, when an individual in a wheelchair accesses vehicle 10, belt position module 100 signals motor 70 to operate linear actuator 64 causing shuttle 66 to move lift ring 85 toward second end 60 of stanchion 56 as shown in FIG. 4. In a non-limiting example, belt position module 100 may be signaled by a first actuator 108 that may take the form of a door switch, a key fob based switch, or a switch/sensor in passenger compartment 20, or simply deactivating the vehicle from a prior use. In this position, a section 120 of intermediate portion 91 of seatbelt 78 that extends between buckle 92 and lift ring 85 is raised, such as shown in FIG. 4, providing unobstructed access to the wheelchair dock.

The extent to which lift ring 85 is raised may be a factory preset as determined by limit switch 105 or may be programmed into non-volatile memory 98. The wheelchair may be locked in place and belt position module 100 signals motor 70 to operate linear actuator 64 causing shuttle 66 to move lift ring 85 toward first end 58 of stanchion 56 as shown in FIG. 2. Belt position module 100 may be signaled by activation of sensor 103, a second actuator, activation of vehicle 10 or the like. When lift ring 85 returns toward first end 58 of stanchion 56, the individual in the wheelchair is safely restrained without the need to manually manipulate seatbelt 78 and/or buckle 92.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A seatbelt system for individuals using a wheelchair, the seatbelt system comprising:
   a stanchion having a first end and a second end;
   a linear actuator fixedly connected relative to the stanchion, the linear actuator including a shuttle, the shuttle being shiftable between the first end and the second end of the stanchion;
   a seatbelt supported by the stanchion, the seatbelt including a buckle, a lap portion, and a shoulder portion, the lap portion being connected to the shuttle;
   a tensioner arranged at the first end of the stanchion, the seatbelt being connected to the tensioner; and
   a controller operatively connected to the linear actuator, the controller selectively raising the shuttle to lift the lap portion of the seatbelt toward the second end of the stanchion to accommodate an individual using a wheel chair.

2. The seatbelt system according to claim 1, further comprising a belt guide positioned above the second end of the stanchion and a fixed anchor spaced from the stanchion that is selectively receptive of the buckle, the lap portion extending between the shuttle and the fixed anchor and the shoulder portion extending between the belt guide and the fixed anchor.

3. The seatbelt system according to claim 2, further comprising a lift ring connected to the shuttle, the seatbelt passing through the lift ring.

4. The seatbelt system according to claim 2, wherein the linear actuator includes a motor and a worm screw, the shuttle being operatively connected to the worm screw.

5. The seatbelt system according to claim 1, wherein the seatbelt includes a first end portion operatively connected to the tensioner, a second end portion connected to an anchor, and an intermediate portion extending between the first end and the second end.

6. The seatbelt system according to claim 5, wherein the intermediate portion passes through the lift ring, the belt guide, and the stanchion to the anchor, the buckle being arranged between the lift ring and the belt guide.

7. A vehicle comprising:
   a body including a floor, at least one structural support fixedly connected relative to the floor, and a seatbelt system comprising:
   a stanchion fixedly connected relative to the at least one structural support, the stanchion having a first end arranged at the floor and a second end spaced from the floor along the at least one structural support;
   a linear actuator fixedly connected relative to the stanchion, the linear actuator including a shuttle, the shuttle being shiftable between the first end and the second end of the stanchion;
   a seatbelt supported by the stanchion, the seatbelt including a buckle, a lap portion, and a shoulder portion; and
   a controller operatively connected to the linear actuator, the controller selectively raising the shuttle to lift the lap portion of the seatbelt toward the second end of the stanchion to accommodate an individual using a wheel chair.

8. The vehicle according to claim 7, further comprising a belt guide positioned above the second end of the stanchion and a fixed anchor spaced from the stanchion that is selectively receptive of the buckle, the lap portion extending between the shuttle and the fixed anchor and the shoulder portion extending between the belt guide and the fixed anchor.

9. The vehicle according to claim 8, wherein the linear actuator includes a motor and a worm screw, the shuttle being operatively connected to the worm screw.

10. The vehicle according to claim 8, further comprising a lift ring connected to the shuttle, the seatbelt passing through the lift ring.

11. The vehicle according to claim 10, further comprising a tensioner arranged at the first end of the stanchion, the seatbelt being connected to the tensioner.

12. The vehicle according to claim 11, wherein the seatbelt includes a first end portion operatively connected to the tensioner, a second end portion connected to an anchor, and an intermediate portion extending between the first end and the second end.

13. The vehicle according to claim 12, wherein the intermediate portion passes through the lift ring, the belt guide, and the stanchion to the anchor, the buckle being arranged between the lift ring and the belt guide.

14. A method of operating a seatbelt system in a vehicle configured to accommodate an individual using a wheelchair, the method comprising:
- unspooling a seatbelt including a lap belt portion from a tensioner mounted on a first end of a stanchion;
- raising a lap belt portion of a seatbelt of the seatbelt by activating a linear actuator to shift a shuttle toward a second end of the stanchion;
- receiving the individual in the wheelchair between a structural support and a seatbelt anchor; and
- lowering the lap belt portion of the seatbelt by activating the linear actuator to shift the shuttle back toward the first end of the stanchion.

15. The method of claim 14, wherein the raising of the lap belt portion includes signaling the seatbelt system to raise the lap belt portion upon deactivating the vehicle.

16. The method of claim 14, wherein the lowering of the lap belt portion of the seatbelt includes activating the vehicle.

17. The method of claim 14, wherein the raising of the lap belt portion includes lifting the lap belt portion to a selected user defined height.

18. The method of claim 14, wherein the raising of the lap belt portion includes operating a motor connected to the linear actuator.

19. The method of claim 18, wherein operating the motor includes shifting a lift ring connected to the shuttle, the lift ring being receptive of the lap belt portion.

* * * * *